United States Patent [19]

Travis

[11] Patent Number: 5,195,198

[45] Date of Patent: Mar. 23, 1993

[54] FAIL-SAFE BED MOTION CONTROL CIRCUIT HAVING A MICROPROCESSOR

[75] Inventor: Stephen C. Travis, Paw Paw Township, VanBuren County, Mich.

[73] Assignee: Stryker Corporation, Kalamazoo, Mich.

[21] Appl. No.: 925,229

[22] Filed: Aug. 3, 1992

Related U.S. Application Data

[63] Continuation-in-part of Ser. No. 821,351, Jan. 15, 1992, abandoned.

[51] Int. Cl.$^5$ .................... A61G 7/018; A61G 7/015
[52] U.S. Cl. ............................................ 5/618; 5/613; 5/424; 307/115; 364/184
[58] Field of Search ..................... 5/424, 600–603, 5/607, 614, 616–619; 318/51, 53; 307/441, 115; 364/184

[56] References Cited

U.S. PATENT DOCUMENTS 3,913,153  10/1975  Adams et al. ........................ 5/616
4,435,862   3/1984  King et al. ........................... 5/618
4,769,584   9/1988  Irigoyen et al. ...................... 5/424
5,053,636  10/1991  Zelina .................................. 5/616

Primary Examiner—Alexander Grosz
Attorney, Agent, or Firm—Flynn, Thiel, Boutell & Tanis

[57] ABSTRACT

A hospital bed has a movably supported part, a selectively actuable drive arrangement for moving the part, a manually actuable control switch, and a control circuit coupled to the switch and drive arrangement. The control circuit includes a microprocessor having an input coupled to the control switch and having an output, and the program executed by the microprocessor selectively actuates the output of the microprocessor based on a function which takes into account the current state of a signal being applied to the microprocessor input. The control circuit also includes a further arrangement which actuates the drive arrangement when the signals from the control switch and microprocessor are both actuated, and which deactuates the drive arrangement when either of these two signals is deactuated.

14 Claims, 4 Drawing Sheets

FAIL-SAFE BED MOTION CONTROL CIRCUIT HAVING A MICROPROCESSOR

This application is a continuation-in-part of U.S. Ser. No. 07/821,351, filed Jan. 15, 1992 now abandoned.

FIELD OF THE INVENTION

The present invention relates to an arrangement for controlling movement of a part on a hospital bed and, more particularly, to such an arrangement which has fail-safe capabilities in order to prevent failure of a control component from causing unintended movement of the part in a manner which could injure a patient.

BACKGROUND OF THE INVENTION

For many years, hospital beds have had movable parts, such as an upper body support part movable between two positions in which it supports the patient in a sitting position and a prone position. Movement of these parts originally was effected manually by hospital personnel, for example by turning a crank provided on the bed.

As technology progressed, drive systems were incorporated into the beds to automatically effect movement of moveable parts. Although motors have been provided for a number of years to move such parts, the control circuits which operate the motors have changed. In recent years, some control circuits have been developed in which a microprocessor has the capability to control operation of one or more motors. While circuits of this type have been generally adequate for their intended purposes, they have not been satisfactory in all respects.

In particular, there have been concerns with safety, in that it is possible for a software error, static electricity, or an internal physical failure to cause the microprocessor to actuate its outputs in an erroneous manner. If such a failure happened to occur at a point in time when no hospital personnel were in the vicinity of the bed, the bed could move in a manner which caused serious injury to a patient. As an example, it will be recognized that a patient with a spinal injury could suffer serious permanent damage if a bed unexpectedly experienced a failure which caused it to move the patient from a prone position to a sitting position. Likewise, since many hospital beds have the capability to tilt the entire patient support surface, for example to place a patient in a position commonly referred to as a Trendelenburg position, erroneous movement of the bed to this position could result in the patient sliding off the bed onto the floor, with various types of bodily injury. While the likelihood of such problems is very small, it is nevertheless desirable to substantially eliminate them.

It is therefore an object of the present invention to provide a microprocessor-based bed control circuit which includes a fail-safe mechanism for preventing movement of any part of the bed unless an attendant is present.

It is a further object to provide such a control system which involves a minimal amount of additional hardware and cost in comparison to conventional microprocessor-based control systems.

SUMMARY OF THE INVENTION

The objects and purposes of the invention, including those set forth above, are met by providing a hospital bed which includes a movably supported part, a selectively actuable drive arrangement for effecting movement of the part, a manually actuable control switch, and a control circuit operationally coupled to the switch and to the drive arrangement. The control circuit includes a microprocessor having an input coupled to the control switch, having an output, and having an arrangement for selectively actuating the output according to a function which includes the current state of a signal being applied to the input thereof by the control switch, and includes a further arrangement for actuating the drive arrangement when the signal from the control switch and a signal from the output of the microprocessor are both actuated, and for deactuating the drive arrangement when either the signal from the control switch or the signal from the microprocessor output is deactuated.

BRIEF DESCRIPTION OF THE DRAWINGS

Two preferred embodiments of the invention are disclosed in detail hereinafter with reference to the accompanying drawings, in which.

DETAILED DESCRIPTION

Figure 1:
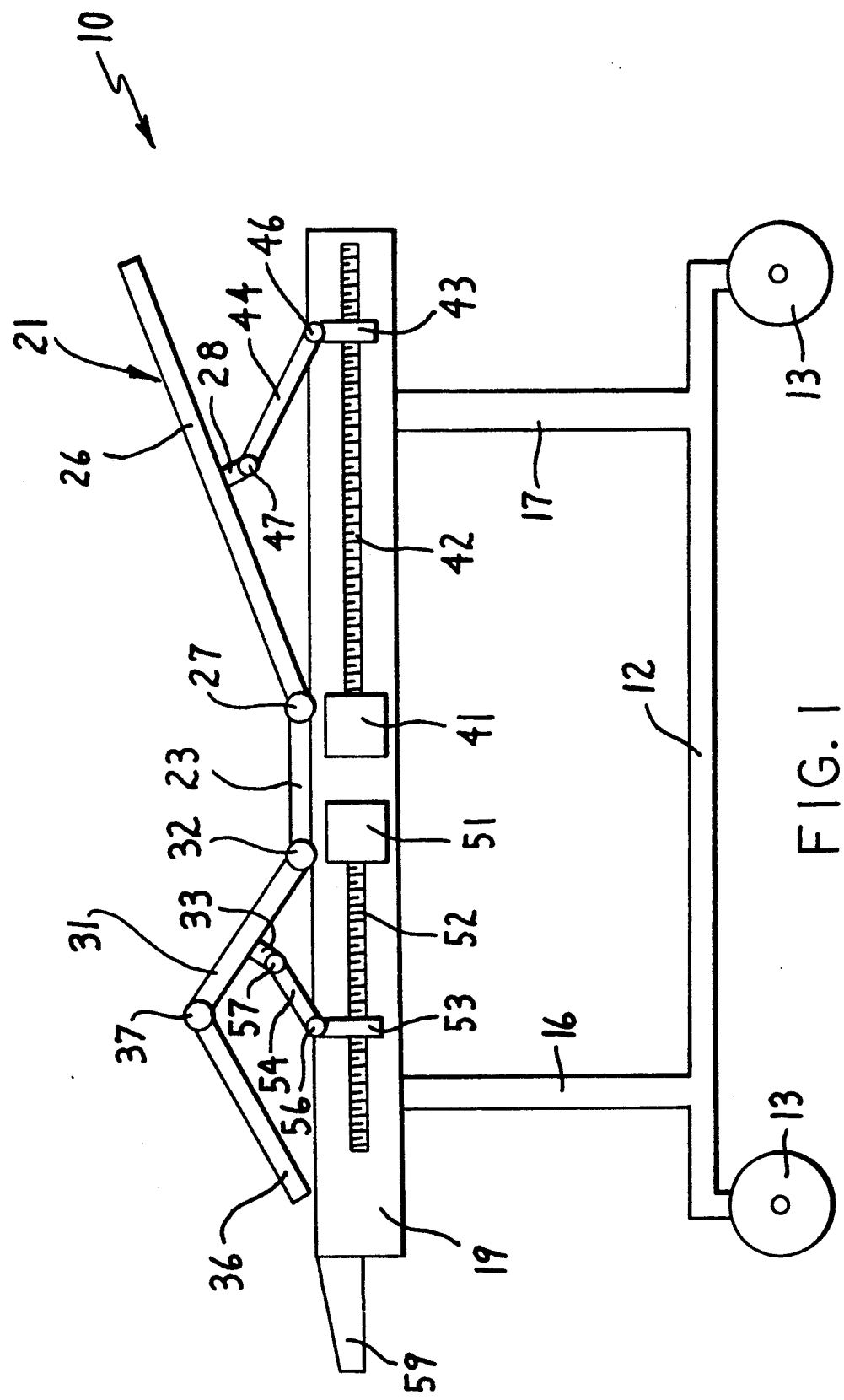
FIG. 1 is a diagrammatic side view of a hospital bed embodying the present invention.

FIG. 1 is a diagrammatic view of a mobile hospital bed or stretcher 10 which embodies the present invention. The bed 10 includes a base 12 movably supported by four casters 13. Two spaced pedestals 16 and 17 are fixedly secured to and extend upwardly from the base 12, and support a frame 19. For purposes of simplicity and clarity, the pedestal 16 and 17 are shown as having fixed vertical heights. However, it will be recognized that conventional pedestals having vertically adjustable heights could be utilized, such as two spaced hydraulic cylinders.

A patient support assembly 21 is supported on top of the frame 19, and includes a horizontally extending center part 23 which is fixedly secured to the upper side of the frame 19 and which can support the pelvic area of a patient. An upper body support section 26 is supported for pivotal movement with respect to the center section 23 about a pivot 27, and has secured to the underside thereof a bracket 28. A thigh support section 31 is supported for pivotal movement with respect to the center section 23 about a pivot 32, and has a bracket 33 secured to the underside thereof. A leg support section is supported for pivotal movement with respect to the thigh support section 31 about a pivot 37.

A first electric motor 41 is fixedly supported on the frame 19 and has an elongate threaded shaft 42. A nut 43 is threadedly engaged with the shaft 42, and a link 44 is pivotally coupled at 46 to the nut and at 47 to the bracket 28. The motor 41 is a conventional and commercially available reversible AC motor, and in the preferred embodiment is obtained from Emerson of St. Louis, Missouri, as part number K33MYC270141. When the motor 41 is actuated to rotate the shaft 42 in a forward direction, the nut 43 moves leftwardly in FIG. 1 so that the link 44 moves the upper body support section 26 upwardly, or in other words counterclockwise about the pivot 27. This is commonly referred to as "fowler up" movement. If the motor 41 is actuated to rotate its shaft 42 in the opposite direction, the nut 43 moves rightwardly and the upper body support section 26 moves downwardly, or in other words clockwise about the pivot 27. This downward movement of the upper body support section 26 is commonly referred to as "fowler down" movement.

A further electric motor 51 is preferably identical to the motor 41 and is fixedly supported on the frame 19, and has an elongate threaded shaft 52. A nut 53 threadedly engages the shaft 52, and a link 54 has one end pivotally supported at 56 on the nut 53, and its other end pivotally supported at 57 on the bracket 33. When the motor 51 is actuated so as to rotate the shaft 52 in a first direction, the nut 53 moves rightwardly in FIG. 1, as a result of which the link 54 pivots the thigh support section 31 upwardly, or in other words clockwise in FIG. 1 about the pivot 32. This is commonly referred to as "knee up" movement. If the motor 51 is actuated so as to rotate its threaded shaft 52 in the opposite direction, the nut 53 moves leftwardly and the thigh support section 31 moves downwardly, or in other words pivots counterclockwise about the pivot 32. This movement is commonly referred to as "knee down" movement.

In FIG. 1, a control panel 59 is mounted on the frame 19 at the left end thereof. The control panel 59 has therein the circuit shown in FIG. 2, including four manually actuable, normally open, momentary pushbutton switches 61-64 which upon actuation respectively effect fowler up movement, fowler down movement, knee up movement and knee down movement. The pushbutton switches 61-64 each have one terminal connected to a line 67 which carries a constant DC voltage Vcc. The opposite terminal of each of the pushbutton switches is connected to ground through a respective one of four 1KΩ resistors 71-74, and is connected to a respective one of four inputs A-D of a conventional microprocessor 75 through respective 100KΩ resistors 76-79.

The microprocessor used in the preferred embodiment is obtained from Motorola of Schaumburg, Ill., as model number MC68HC705C8. However, persons familiar with this art will recognize that virtually any conventional and commercially available microprocessor could be used for the microprocessor 75. The microprocessor 75 has four outputs A-D, which are each coupled to the input of a respective relay driver circuit 81-84. In the preferred embodiment, the relay driver circuits 81-84 are commercially available integrated circuits obtained from National Semiconductor Corporation of Santa Clara, Calif. as part number DS3686.

Four conventional diodes 86-89 each have an anode connected to a respective one of the pushbutton switches 61-64 at the terminal thereof remote from the line 67. The cathodes of the diodes 86-89 are all connected to a common line 91, which leads to one end of the coil of a fail-safe relay 92, the opposite end of the coil being connected to ground at 93. The relay 92 is a conventional and commercially available part, and in the preferred embodiment is obtained from Electronic Applications Components as part number DIA05H. The common terminal for the output contact of the relay 92 is connected to the DC power source Vcc.

Four additional relays 96-99 are provided, which in the preferred embodiment are each conventional components obtained from Potter Bramfield of Princeton, Ind. as part number RKS-5DW-12DC. Each of the relays 96-99 have a coil with one end connected to the output of a respective one of the relay drivers 81-84, the opposite end of the coil of each of the relays 96-99 being connected to a line 101 which is driven by the normally open (NO) output terminal of the relay 92. The common output terminal of each of the relays 96 and 98 is connected to a line 102 which carries AC power from a conventional and not-illustrated AC power source. The common output terminal of the relay 97 is connected to the normally closed (NC) output terminal of the relay 96, and the common output terminal of the relay 99 is connected to the normally closed output terminal of relay 98. The normally open output of relay 96 is connected to a forward control terminal of the motor 41, the normally open output terminal of relay 97 is connected to a reverse control input of the motor 41, the normally open output terminal of the relay 98 is connected to the forward control input of the motor 51, and the normally open output terminal of the relay 99 is connected to a reverse control input of the motor 51. A common or neutral line from the AC power source is connected to a common terminal of each of the motors 41 and 51.

Figure 2:
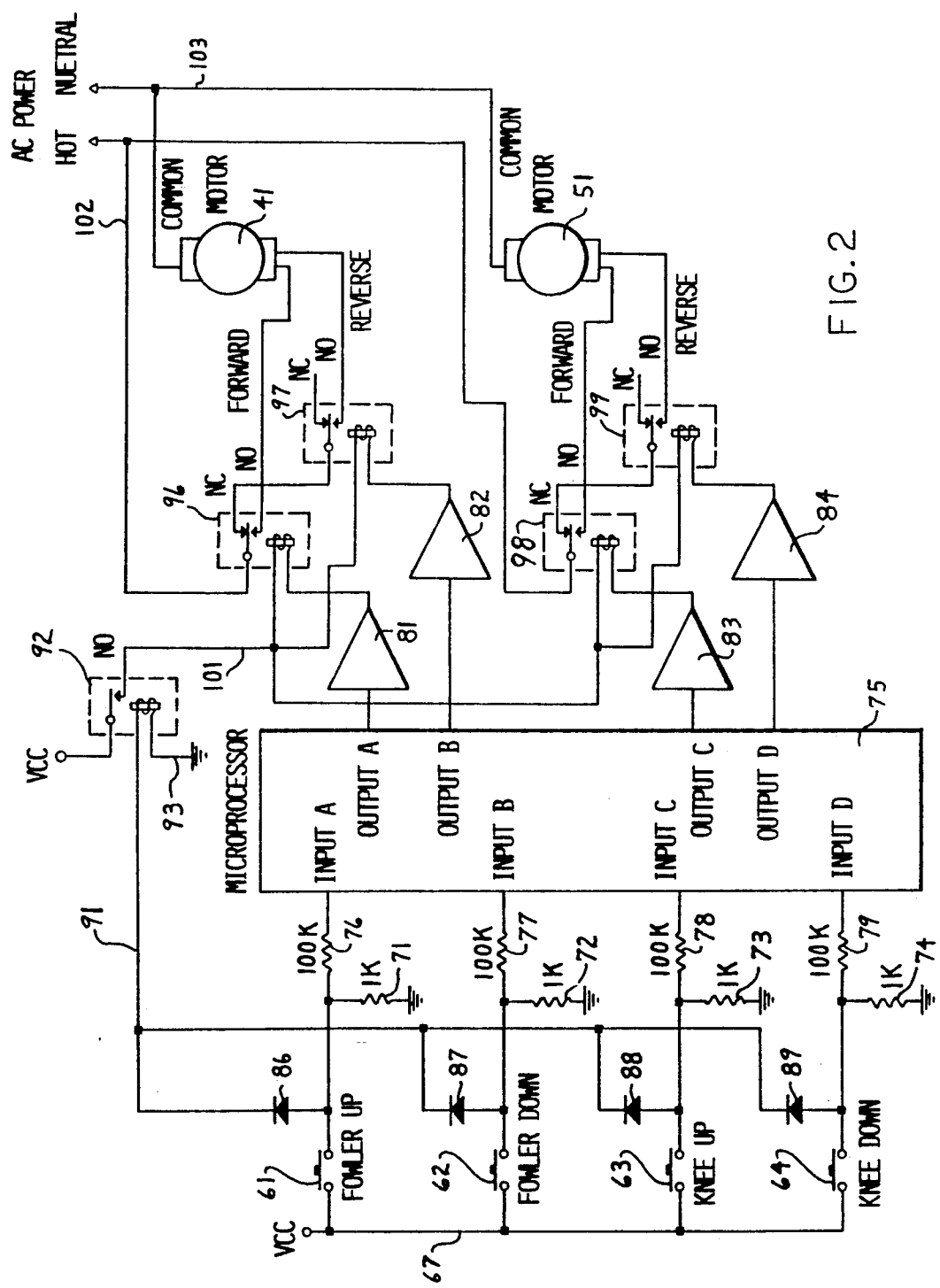
FIG. 2 is a schematic diagram of a control circuit embodied in the hospital bed of FIG. 1.
Figure 3:
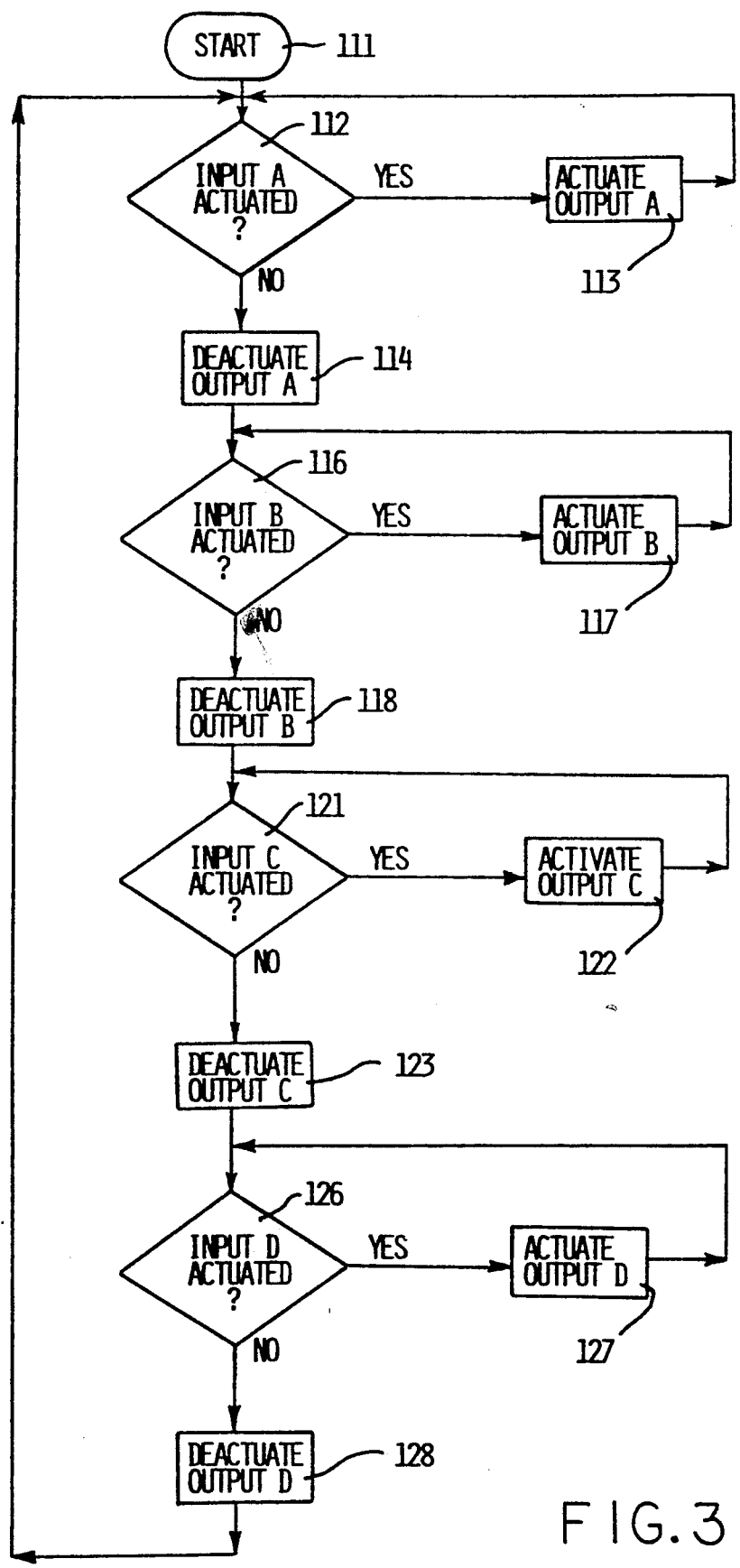
FIG. 3 is a flowchart of a portion of a control program for a microprocessor which is a component of the circuit of FIG. 2.

Turning to FIG. 3, the depicted flow chart represents a portion of the control program executed by the microprocessor 75. For clarity, portions of the program which are not pertinent to an understanding of the present invention have been omitted, only the portions important to the present invention being set forth in FIG. 3. In FIG. 3, the microprocessor begins execution at block 111, and proceeds to block 112 where it checks to see if input A (FIG. 2) is actuated. If it is, then control proceeds to block 113, where the microprocessor actuates its output A. So long as input A remains actuated, the microprocessor remains in blocks 112 and 113 and keeps output A actuated. When input A becomes deactuated, the microprocessor proceeds to block 114, where it deactuates output A in order to ensure that output A is deactuated.

Execution then proceeds to block 116. Blocks 116, 117 and 118 are respectively equivalent to blocks 112-114, except that they relate to input B and output B. Similarly, blocks 121-123 are respectively equivalent to blocks 112-114 except that they relate to input C and output C, and blocks 126-128 are respectively equivalent to blocks 112-114 except that they relate to input D and output D. From block 128, control returns to block 112, and the sequence repeats.

Figure 4:
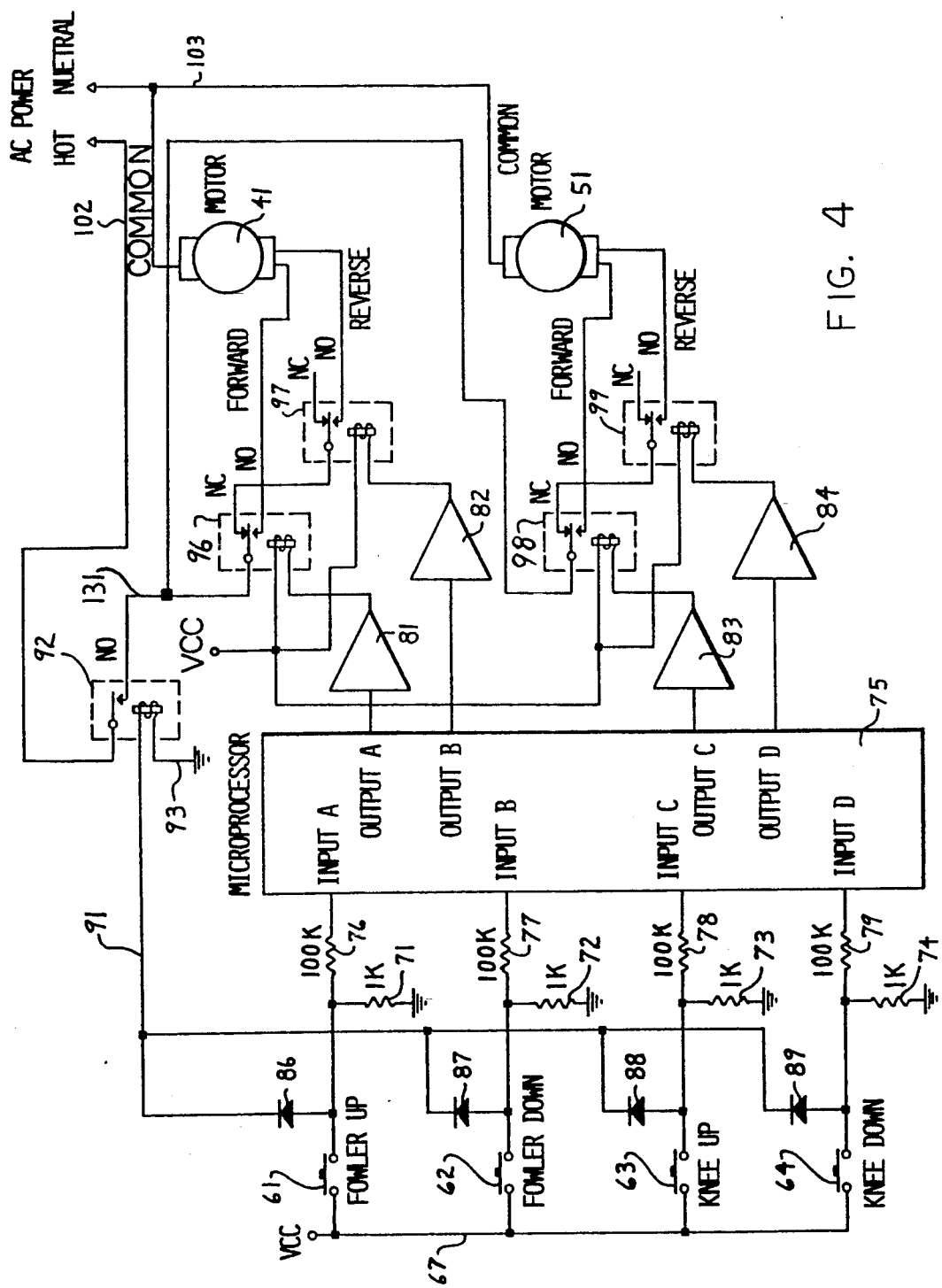
FIG. 4 is a schematic diagram of an alternative embodiment of the control circuit of FIG. 2.

FIG. 4 shows an alternative embodiment of the control circuit of FIG. 2. Components in FIG. 4 which are equivalent to components in FIG. 2 are designated with the same reference numerals. Only the differences between FIGS. 2 and 4 are described in detail hereinafter.

In FIG. 4, the line 102 carrying AC power is connected to the common terminal for the output contact of the fail-safe relay 92. The normally open output terminal of the fail-safe relay 92 is connected at 131 to the common terminals for the output contacts of relays 96 and 98. The coils of relays 96-99 are each connected, at the end remote from the associated one of the relay drivers 81-84, to a source of DC power at voltage Vcc.

OPERATION

Referring to FIG. 2, when the switches 61-64 are all deactuated, the voltage across each of the resistors 71-74 will be less than one volt, because of the path to ground at 93 through a respective one of the diodes 86-89 and through the coil of relay 92. Thus, each of the inputs A-D of the microprocessor 75 will have applied thereto a logic low voltage. Further, the voltage across the coil of relay 92 will be substantially zero, and thus the relay 92 will not be actuated and the contact will be open, so that DC power from source Vcc is not being supplied through the contact of relay 92 to the other four relays 96–99. Since inputs A-D of the microprocessor are all receiving logic low signals, the microprocessor 75 will be outputting logic low signals on each of its outputs A-D, and thus the relay drivers 81–84 will not be attempting to actuate the relays 96–99. Since the relays 96–99 are all deactuated, the motors 41 and 51 will each also be deactuated.

Assume now that the switch 61 is manually pressed and held. The switch 61 will supply the DC voltage Vcc to the anode of diode 86, thereby generating a voltage across the coil of relay 92 which actuates the relay and closes its contact, so that the DC voltage Vcc is supplied through the contact of relay 92 to one end of the coil of each of the relays 96–99. Simultaneously, switch 61 is supplying the DC voltage Vcc to the resistor 76, so that a logic high voltage is applied to input A of the microprocessor, in response to which the microprocessor actuates its output A, which in turn actuates the relay driver 81 in a manner so that a voltage exists across the coil of relay 96, thereby actuating relay 96 so that the contact engages the normally open terminal NO and thus supplies AC power from line 102 across the line FORWARD to the motor 41, thereby causing the motor 41 to rotate its threaded shaft 42 (FIG. 1) in a manner raising the upper body support portion 26. When the switch 61 is released, the circuit returns to its original condition with the relays 92 and 96 deactuated, and thus with the motor 41 deactuated. Movement of the upper body support section 26 then stops.

In a similar manner, if the switch 62 is manually pressed, the relay 86 is actuated and the microprocessor actuates its output B so that the relay driver 82 actuates the relay 97. The relay 96 will be deactuated, and thus AC power will be supplied from line 102 through the normally closed terminal (NC) of the relay 96 to the contact of relay 97 and, since relay 97 is actuated, through the normally open terminal NO to the line REVERSE to the motor 41. The motor 41 will thus rotate its shaft in a reverse direction. When the switch 62 is manually released, the relay 92 will be deactuated, while microprocessor 75 will use relay driver 82 to deactuate the relay 97, so that operation of the motor 41 is terminated.

In a similar manner, if either of the switches 63 and 64 is manually actuated, the relay 92 is actuated and one of the relays 98 and 99 is actuated so that the motor 51 rotates its shaft in respective one of forward and reverse directions. When the actuated one of switches 63 and 64 is released, the motor 51 stops rotating.

It is important to note that the relay 92 is actuated only when an operator is manually pressing any one of the push buttons 61–64. Assuming that the microprocessor 75 experiences some type of failure which causes it to internally short one or more of its outputs A–B directly to a source of power, a resulting actuation of one or more of the outputs A–D will not be capable of erroneously actuating the associated one of relays 96–99 when no operator is present, because the absence of an operator means that none of the pushbutton switches 61–64 will be actuated, the relay 92 will be deactuated, and thus the relay 92 will not be supplying power to the coils of the relays 96–99. Consequently, even if the microprocessor 75 undergoes a catastrophic failure, the failure will not be capable of causing either of the motors 41 and 51 to operate, thereby ensuring that the patient support assembly 21 does not suddenly move in an unintended manner which could cause injury to a patient lying on it.

In the event an operator is present and pressing one of the buttons 61–64, a microprocessor failure could actuate one or both of the motors 41 and 51 so as to cause movement of the patient support assembly 21 in a manner different from that intended by the operator, but since the operator must be present and must necessarily be pressing one of the buttons 61–64, the operator should immediately detect that the patient support assembly 21 is not moving as intended and remove his or her finger from the button on the control panel, thereby deactuating the relay 92 so as to in turn disable all of the relays 96–99 and thus disable both of the motors 41 and 51.

It will be recognized that the fail safe feature discussed above is effective not only for failures of the microprocessor 75, but also of various other circuit components, including for example the relay drivers 81–84.

Turning to the alternative embodiment of FIG. 4, the operation of the circuit of FIG. 4 is similar to the operation of the circuit of FIG. 2, and is therefore not described in detail. The basic difference is that, when the fail-safe relay 92 in FIG. 2 is deactuated, it interrupts DC power Vcc to the coils of each of the relays 96–99. In contrast, when the fail-safe relay 92 of the circuit of FIG. 4 is deactuated, it interrupts AC power to the common terminals of the output contacts of relays 96 and 98. In each of FIGS. 2 and 4, when the fail-safe relay 92 is deactuated, the motors 41 and 51 are operationally disabled.

One preferred embodiment of the invention has been disclosed in detail for illustrative purposes, but it will be recognized that there are variations and modifications of the disclosed apparatus, including the rearrangement of parts, which lie within the scope of the present invention.

The embodiments of the invention in which an exclusive property or privilege is claimed are defined as follows:

1. An apparatus comprising: a hospital bed which includes a movably supported part, selectively actuable drive means for effecting movement of said part, a manually actuable control switch, and a control circuit operationally coupled to said switch and to said drive means, said circuit being adapted to prevent the movement by said drive means of said part unless an attendant manually actuates said control switch, wherein said control circuit includes a microprocessor having an input coupled to said control switch, said microprocessor having an output, and said microprocessor having means for selectively actuating said output thereof according to a function which includes the current state of a signal being applied to said input thereof by said control switch, and further means for actuating said drive means when said signal from said control switch and a signal from said output of said microprocessor are both actuated, and for deactuating said drive means when either of said signal from said control switch and said signal from said output of said microprocessor is deactuated, whereby upon a disfunction of the microprocessor, in the absence of an attendant manually actuating the control switch, the drive means is prevented from effecting the movement of said part.

2. An apparatus of claim 1, including a manually actuable further control switch coupled to a further input of said microprocessor, said microprocessor actuating a further output thereof on the basis of a function which includes the current state of a signal being supplied to said further input by said further control switch, and wherein said further means actuates said drive means when said signal from said further control switch and a signal from said further output of said microprocessor are both actuated, and deactuates said drive means when either of said signal from said further control switch and said signal from said further output of said microprocessor is deactuated.

3. An apparatus of claim 2, wherein said drive means effects movement of said part in a first direction when said signal from said first-mentioned control switch and said signal from said first-mentioned output of said microprocessor are both actuated, and effects movement of said part in a second direction opposite said first direction when said signal from said further control switch and said signal from said further output of said microprocessor are both actuated.

4. An apparatus of claim 1, wherein said further means includes a first relay having a control coil with first and second ends, said first end of said coil of said first relay being coupled to said output of said microprocessor, and having a normally open output contact which, when respectively open and closed, respectively effects and interrupts a connection between said drive means and a source of power, said further means further including a second relay having a normally open output contact which, when respectively closed and open, respectively effects and interrupts a connection between a source of power and said second end of said coil of said first relay, said second relay having a coil with a first end coupled to a cathode of a diode and a second end coupled to ground, said diode having an anode coupled to said control switch.

5. An apparatus of claim 4, including a further control switch coupled to a further input of said microprocessor, and a further diode having an anode coupled to said further control switch and having a cathode coupled to said first end of said coil of said second relay.

6. An apparatus of claim 5, including a relay driver circuit having an input coupled to said output of said microprocessor and having an output coupled to said first end of said coil of said first relay.

7. An apparatus of claim 5, wherein said microprocessor has a further output and means for selectively actuating said further output according to a function which includes the current state of a signal being applied to said further input by said further control switch, and wherein said further means includes a third relay having a control coil with a first end coupled to said further output of said microprocessor and a second end coupled to said normally open contact of said second relay, said first relay having a normally closed output terminal which is coupled to a common terminal of said contact of said third relay, and said third relay having a normally open output terminal which is coupled to said drive means, said drive means being responsive to actuation of said first and second relays for effecting movement of said part in a first direction and being responsive to actuation of said second and third relays for effecting movement of said part in a second direction opposite said first direction.

8. An apparatus of claim 7, wherein said drive means includes a reversible electric motor having a shaft, and means responsive to rotation of said shaft in respective directions which are opposite for respectively moving said part in said first and second directions.

9. An apparatus of claim 1, including a first resistor having a first end connected to said control switch and having a second end connected to said input of said microprocessor, and including a second resistor having a resistance substantially less than the resistance of said first resistor, having a first end connected to said first end of said first resistor, and having a second end connected to ground.

10. An apparatus of claim 1, wherein said further means includes a first relay having a control coil with first and second ends respectively coupled to said output of said microprocessor and to a source of power, and having a common terminal coupled to a normally open output contact which, when respectively open and closed, respectively effects and interrupts a connection between said drive means and said common terminal, said further means further including a second relay having a normally open output contact which, when respectively closed and open, respectively effects and interrupts a connection between a source of power and said common terminal of said first relay, said second relay having a coil with a first end coupled to a cathode of a diode and a second end coupled to ground, said diode having an anode coupled to said control switch.

11. An apparatus of claim 10, including a further control switch coupled to a further input of said microprocessor, and a further diode having an anode coupled to said further control switch and having a cathode coupled to said first end of said coil of said second relay.

12. An apparatus of claim 11, including a relay driver circuit having an input coupled to said output of said microprocessor and having an output coupled to said first end of said coil of said first relay.

13. An apparatus of claim 11, wherein said microprocessor has a further output and means for selectively actuating said further output according to a function which includes the current state of a signal being applied to said further input by said further control switch, and wherein said further means includes a third relay having a control coil with a first end coupled to said further output of said microprocessor and a second end coupled to said second end of said coil of said first relay, said first relay having a normally closed output terminal which is coupled to a common terminal of said contact of said third relay, and said third relay having a normally open output terminal which is coupled to said drive means, said drive means being responsive to actuation of said first and second relays for effecting movement of said part in a first direction and being responsive to actuation of said second and third relays for effecting movement of said part in a second direction opposite said first direction.

14. An apparatus of claim 13, wherein said drive means includes a reversible electric motor having a shaft, and means responsive to rotation of said shaft in respective directions which are opposite for respectively moving said part in said first and second directions.

* * * * *